March 13, 1951  J. K. BREWSTER  2,545,339
STABILIZER FOR SEMITRACTORS AND TRAILERS
Filed Jan. 14, 1947 4 Sheets-Sheet 1
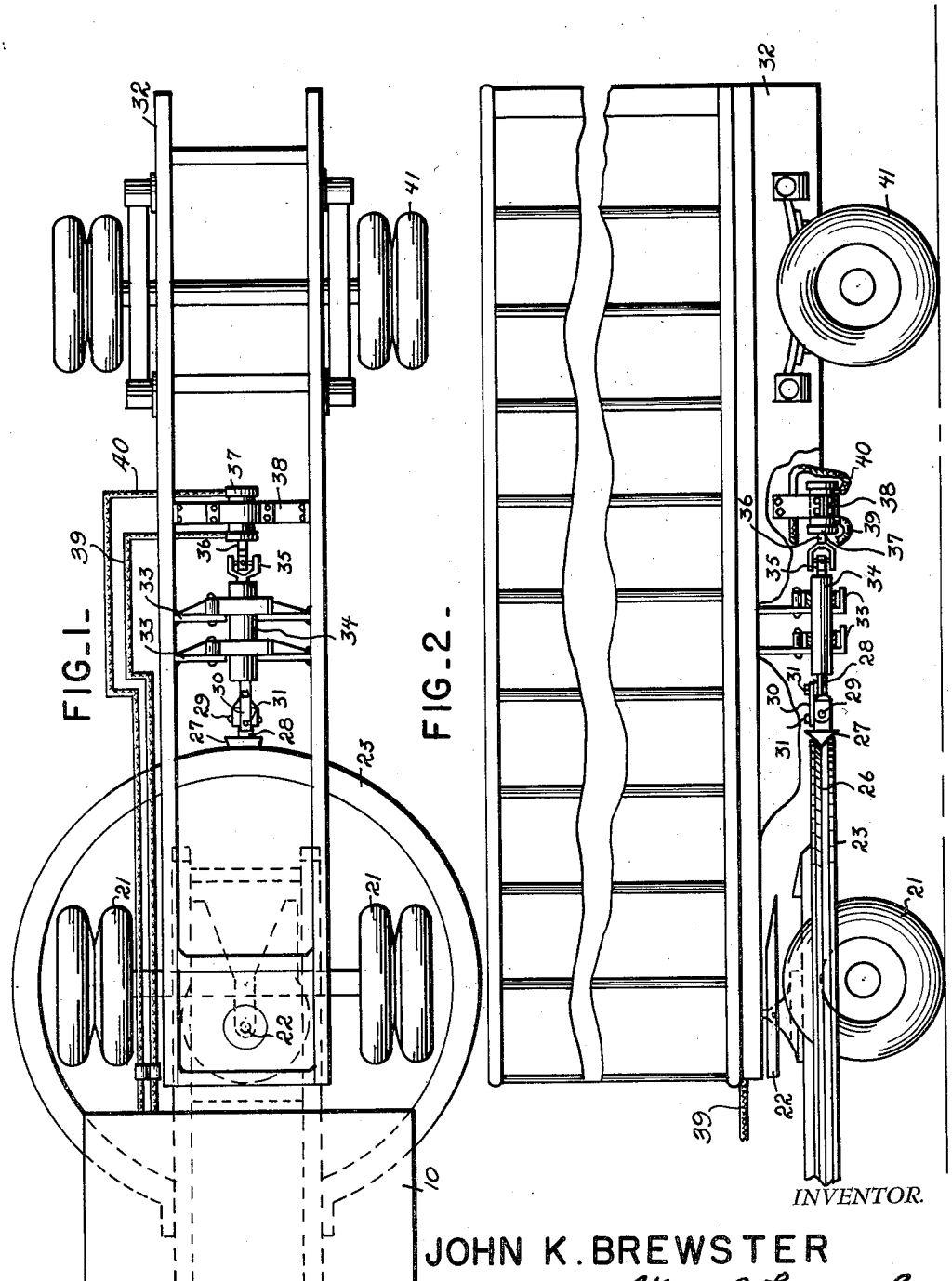
INVENTOR.
JOHN K. BREWSTER
BY *Victor J. Evans & Co.*
ATTORNEYS March 13, 1951  J. K. BREWSTER  2,545,339
STABILIZER FOR SEMITRACTORS AND TRAILERS
Filed Jan. 14, 1947  4 Sheets-Sheet 2
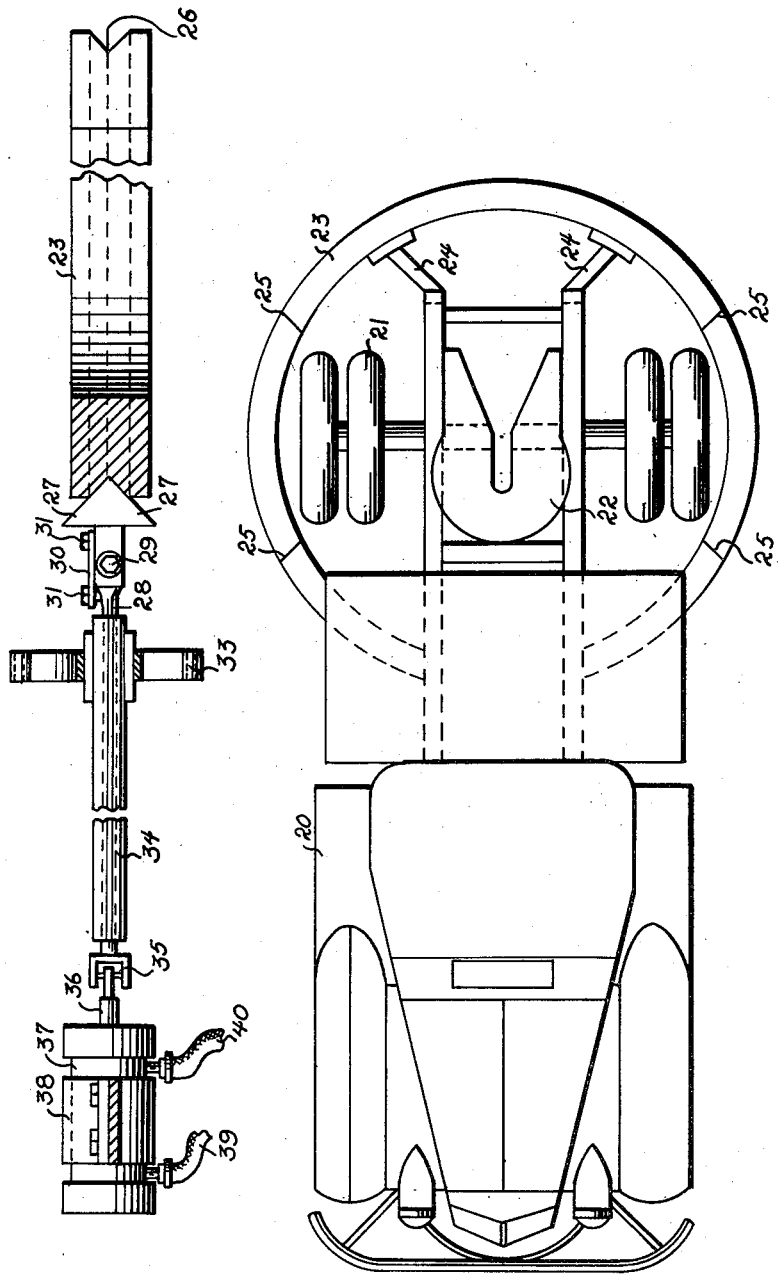
FIG_6_  FIG_3_
INVENTOR.
JOHN K. BREWSTER
BY *Victor J. Evans & Co.*
ATTORNEYS March 13, 1951     J. K. BREWSTER     2,545,339
STABILIZER FOR SEMITRACTORS AND TRAILERS
Filed Jan. 14, 1947     4 Sheets-Sheet 3
FIG_4_
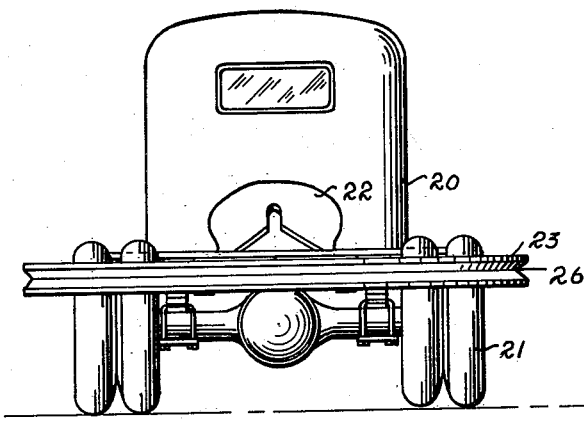
FIG_5_
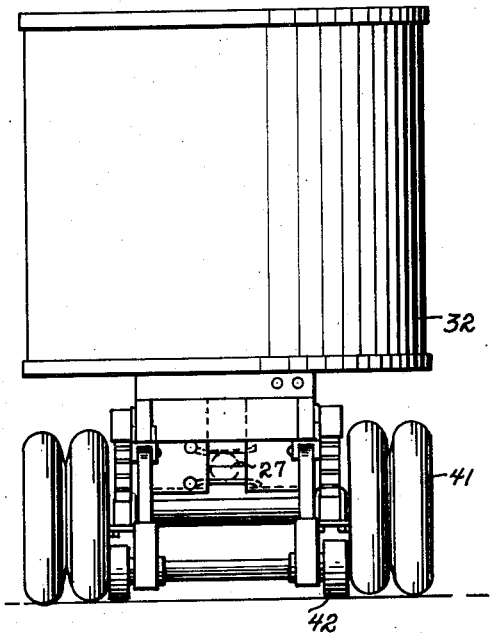
INVENTOR.
JOHN K. BREWSTER
BY Victor J. Evans & Co.
ATTORNEYS March 13, 1951 J. K. BREWSTER 2,545,339
STABILIZER FOR SEMITRACTORS AND TRAILERS
Filed Jan. 14, 1947 4 Sheets-Sheet 4
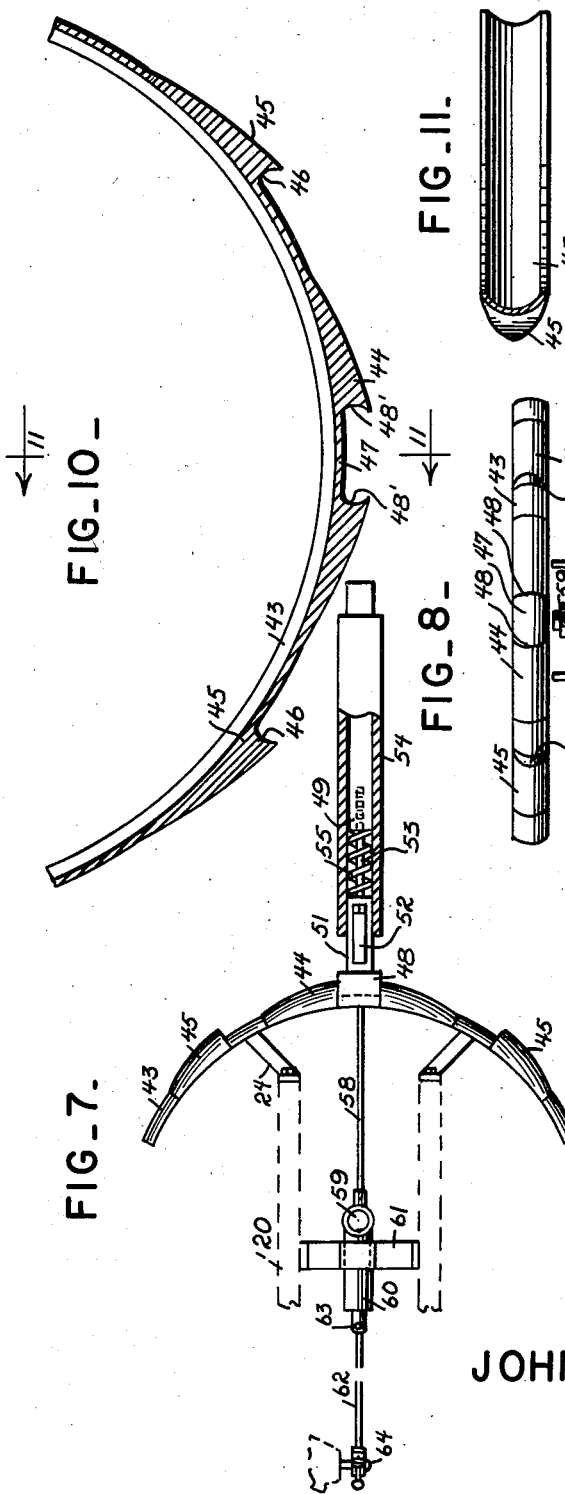
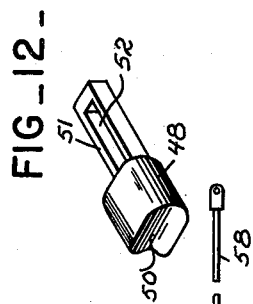
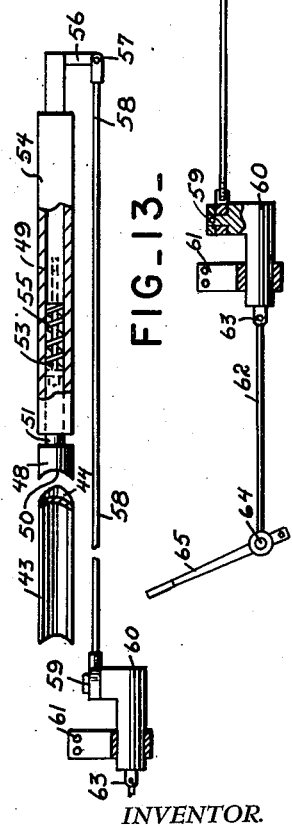
INVENTOR.
JOHN K. BREWSTER
BY Victor J. Evans & Co.
ATTORNEYS Patented Mar. 13, 1951

2,545,339

UNITED STATES PATENT OFFICE 2,545,339

STABILIZER FOR SEMITRACTORS AND TRAILERS

John K. Brewster, Detroit, Mich., assignor of one-half to Clara J. Brewster, Detroit, Mich.

Application January 14, 1947, Serial No. 721,940

2 Claims. (Cl. 280—33.05)

This invention relates to improvements in stabilizers for semi-tractors and trailers.

An object of the invention is to provide a stabilizer that will eliminate jack-knifing of semi-tractors and trailers.

The invention comprises a new and different type of radius member that, when engaged with the stabilizer bar will, when the trailer and tractor are out of alignment, overcome the tendency of the trailer to side draft and return the trailer to its alignment with the tractor to proceed forward in a straight line.

With the above and other objects and advantages in view, the invention consists of the novel details of construction, arrangement and combination of parts more fully hereinafter described, claimed and illustrated in the accompanying drawings in which:

Figure 1 is a top plan view of an embodiment of the invention;

Figure 2 is a side view thereof with the trailer to which it is attached partly broken away;

Figure 3 is a top plan view of the tractor;

Figure 4 is a rear view of the tractor;

Figure 5 is a front view of the trailer;

Figure 6 is a side elevational view partly in section of the device, per se;

Figure 7 is a top view of a modified tractor radius member;

Figure 8 is a front view thereof;

Figure 9 is a longitudinal sectional view of Figure 7;

Figure 10 is a sectional view of the radius member;

Figure 11 is a sectional view on the line 11—11 of Figure 10;

Figure 12 is a perspective view of the stabilizer bar head and

Figure 13 is an elevational view, partly in section of the control for the stabilizer bar.

Referring more in detail to the drawings, the reference numeral 20 designates a motor trailer having traction wheels 21 and the fifth wheel or trailer hitch 22. With the center of the fifth wheel as the center of an imaginary circle drawn to include the outer sides of the traction wheels, a radius member or ring 23 is mounted on the tractor by brackets 24. The ring 23 is made in sections as shown by the division lines 25 in Figure 3, and these sections may be connected in any suitable manner.

The outer periphery of the ring 23 is provided with a V-shaped groove 26 which is adapted to receive the complementary shaped head 27 of the stabilizer bar 28. The head 27 is pivotally connected to the bar 28 by a bolt 29 and the adjusting spring plate 30, in which are mounted bolts 31. Thus should the ring 23 raise or lower due to unevenness of the road the spring action of the plate 30 will permit the head 27 to pivot on the bolt 29. As soon as the ring 23 is again in horizontal position the action of the plate 30 will retain the head 27 in engagement with the ring 23. The plate will also retain the head in horizontal position and spring plate 30 retains the head in horizontal position when the tractor is disconnected from the trailer 32 on which the stabilizer bar is mounted. Such mounting is accomplished by bumpers 33 which are secured to the chassis of the trailer 32, and carry the elongated tubular member 34 in which the bar 28 is slidably mounted.

The bar, at its opposite end, is connected by a universal joint 35 to the piston rod 36 of the hydraulically operated cylinder 37 which is mounted on the chassis of the tractor 32 by a bracket 38, and control lines 39 and 40 respectively lead to the cab of the tractor, see Fig. 1. The lines 39 and 40 being connected to a hand controlled valve mechanism within reach of the operator for convenient control of the cylinder 37 as desired.

The trailer, as shown in Figure 5, is provided with rear wheels 41 and supporting wheels 42 which support the trailer when the tractor is unhitched therefrom.

The sectional ring 23 is of a height on the tractor to correspond with the height of the frame from the ground, and is stationary at all times, and the bar 28 is therefore mounted on the trailer so that the bar is in true horizontal alignment with the ring 23.

In operation, when the tractor or trailer deviates from a straight course, then the ring 23 and bar 28 are at all times in alignment with each other, and thus the same resistance is applied to the ring 23 at any position of the engagement of the head 27 of the bar 28. Thus when the brakes for the tractor and trailer are applied, the resistance that is needed to prevent side draft of the trailer is provided. The head 27, in its greatest rearward movement out of engagement with the ring 23, should move no further than the brake band of the conventional brakes of a motor vehicle.

In Figures 7 to 13, inclusive, the ring 43, only a section of which is shown, is secured to the tractor 20 by brackets 24, but the ring in this instance is approximately a quarter round, and is provided with a centrally located curved stop lug 44 and curved stop lugs 45, which are formed on the periphery of the ring 43 on opposite sides of the lug 44. The lugs 45 are substantially one-half the size of lug 44, and are provided with curved inner shoulders 46 while the lug 44 has a central recess 47 having similarly curved ends 48'. The recess 47 forms the lug 44 into two sections which are similar in shape to the lugs 45.

The head 48 of the stabilizer bar 49 is curved on its face at 50 to conform to the shape of the ring 43. The head is provided with a stem 51 having a longitudinal slot 52 therein to loosely receive the head of the elongated drag pin or bolt 53 which is connected to the bar 49, and the stem of the head and bar are mounted in the housing 54, and a coil spring 55 on the bolt 53 intermediate the stem and bar cushions the mounting of the head with its engagement with the ring. The spring also urges the head into engagement with the ring 43, and into engagement with the shoulders 46, and recess 47. If, therefore, the trailer should attempt to swing out of alignment with the tractor, the lugs 45 will engage the head 48 and prevent the trailer from swinging in that direction too far. However, if the side draft is to great, and damage might result from too sudden a stop of the side draft, the spring will permit the head to be moved over the high end of the tapered lugs by actuation of a handle 65 to be later described, and the spring will also tend to maintain the same resistance at all times between the bar and head.

In normal position, the head will engage in the recess 47, and a bracket 56 on the rear end of the bar 49 is pivotally connected at 57 to a control rod 58 connected at 59 to the lever 60, slidably mounted in the bracket 61 secured to the tractor 20, and a rod 62 connected at 63, to the lever 60, and at 64 to the handle 65, whereby movement of the handle 65 will engage or disengage the head 48 from the ring 43.

There has thus been provided a device which will effectively carry out the objects of the invention, and it is believed that from the foregoing description, the operation and construction of the invention will be apparent to those skilled in the art.

It is also to be understood that changes in the minor details of construction, arrangement and combination of parts may be resorted to, provided they fall within the spirit of the invention and the scope of the appended claims.

Having thus described the invention, what is claimed as new and desired to be secured by Letters Patent is:

1. A device of the character described, to prevent side draft between a trailer and tractor comprising a stationary ring mounted on the tractor, a bar mounted on the trailer having a head thereon engageable with the ring, pressure applied means carried by said bar and urging said head into engagement with said ring, whereby pressure is maintained between the head of the bar on the trailer and the ring on the tractor at all positions of misalignment of said trailer and tractor.

2. The invention as in claim 1 wherein the ring is formed of several sections and a V-shaped groove is formed in the periphery of said ring and the head on the bar is similarly shaped to engage in said groove.

JOHN K. BREWSTER.

REFERENCES CITED

The following references are of record in the file of this patent:

UNITED STATES PATENTS

| Number | Name | Date |
|---|---|---|
| 1,078,801 | Munsing | Nov. 18, 1913 |
| 2,213,221 | Johnson | Sept. 3, 1940 |